(12) United States Patent
Paul

(10) Patent No.: US 6,265,208 B1
(45) Date of Patent: Jul. 24, 2001

(54) DEVICE FOR STORING, DISPENSING AND RECYCLING A CLEANING SUSPENSION INCLUDING A REGENERATING MICROORGANISM ABSORBENT SUSPENSION

(76) Inventor: Steven Paul, 50 Overlook Heights Way, Stockbridge, GA (US) 30281

( * ) Notice: Subject to any disclaimer, the term of this patent is extended or adjusted under 35 U.S.C. 154(b) by 0 days.

(21) Appl. No.: 09/224,704

(22) Filed: Jan. 4, 1999

(51) Int. Cl.[7] .......................... D06M 16/00; C12M 1/00
(52) U.S. Cl. .................. 435/264; 435/281; 435/289.1; 435/307.1
(58) Field of Search .................. 435/281, 289.1, 435/307.1, 262, 264

(56) References Cited

U.S. PATENT DOCUMENTS 5,185,261 * 2/1993 Warrington .......................... 435/313
5,206,169 * 4/1993 Bland .................................. 435/284
5,994,122 * 11/1999 Cooper et al. ..................... 435/290.1

* cited by examiner

*Primary Examiner*—David A. Redding
(74) *Attorney, Agent, or Firm*—Kilpatrick Stockton LLP

(57) ABSTRACT

The invention is a device for storing, dispensing and recycling a suspension of regenerating microorganism. The device provides an opening allowing a user to remove a portion of the suspension. The device defines a first area for receipt of new suspension and a second area for dispensing of such suspension for use. Preferably, an angled plate in the interior of the device forms a passage through which the suspension passes towards the dispensing opening. After use, the used suspension is recycled by again pouring the used suspension back into the device through a screen cover. The device allows a user to continue to reuse suspension from the device in that the device recycles such suspension in a manner that allows the microorganism to regenerate as it travels through the device towards the dispensing opening.

18 Claims, 4 Drawing Sheets

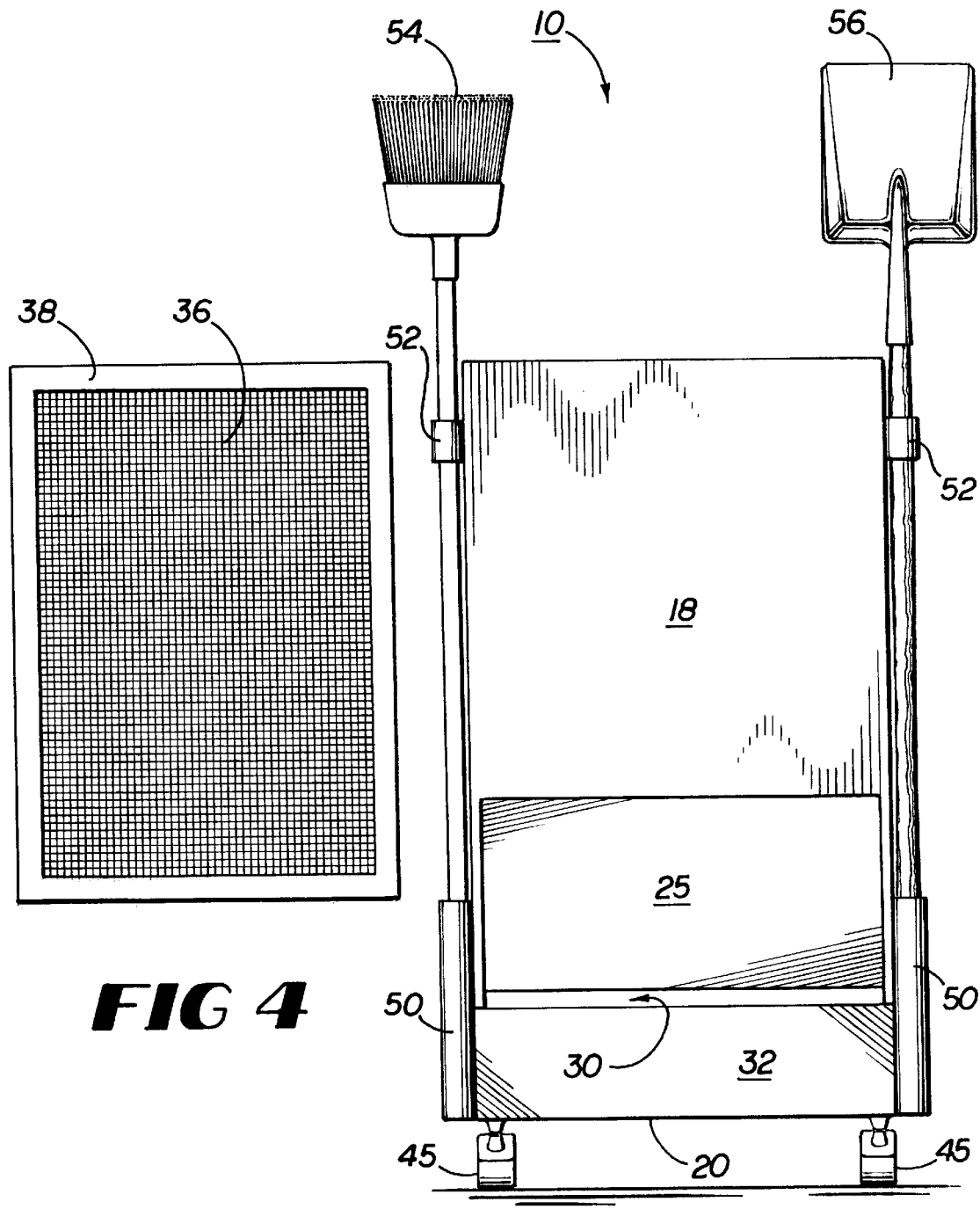

Figure 1:
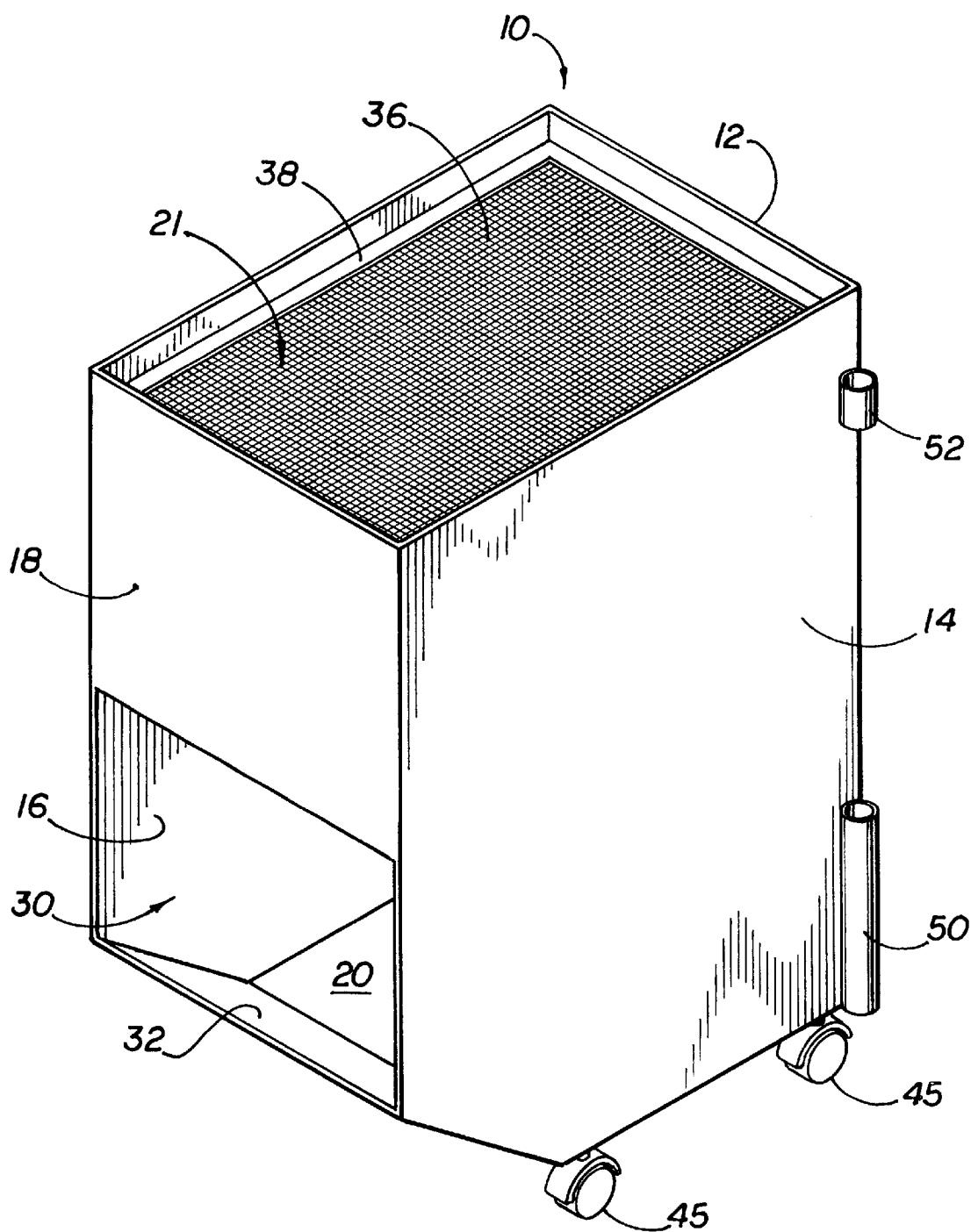

DEVICE FOR STORING, DISPENSING AND RECYCLING A CLEANING SUSPENSION INCLUDING A REGENERATING MICROORGANISM ABSORBENT SUSPENSION

FIELD OF THE INVENTION

The present invention relates to the storage, dispensing and recycling of a cleaning suspension including a microorganism. More particularly, the present invention relates to a device for storing, dispensing and recycling a suspension including a regenerating petrophilic microorganism that permits the microorganism to regenerate before reuse.

BACKGROUND OF THE INVENTION

The industrial environment is seemingly inherently contaminated by a variety of petroleum or other hydrocarbon-based products. For example, heavy machinery requires constant maintenance ranging from part repair to lubrication. Such operations inevitably result in spillage of a variety of hydrocarbon-based fluids. Further, particularly in the case of older equipment, seals may leak and a variety of different contaminants such as oil, greases, fuel and other hydrocarbons spilled or leaked onto the floor. Such problems are not restricted to factories or other industrial environments using heavy machinery. Similar problems exist in many other environments from small and lightweight manufacturing facilities to the home mechanic changing oil in his or her garage. Whether due to a leaky seal in a piece of heavy equipment or a spill while changing oil in a car, such spills typically contain toxic substances and can be extremely hazardous. Moreover, the presence of an oil spill or the like in a factory walkway or other common area is a significant risk to workers. Thus, such spills must be promptly and properly cleaned to ensure safety and to reduce if not eliminate unwanted hydrocarbon products from the environment except for their intended use.

As a result, a variety of clay-based products are available to address hydrocarbon product spillage. Such clay products are typically provided in a container or other suitable package provided by the manufacturer for sale or shipment of the product. When placed on a hydrocarbon spill, the clay product absorbs the spill. A variety of such products are available from various sources. One such known product is sold under the trademark OIL DRY. Another is offered under the trademark MIRACLE SWEEP. Other such clay products include cat litter. The use of such products is to place the clay-based material onto the spill and leave for a sufficient period to permit absorption of the spill. The used product, including the hydrocarbon can then be swept up and the spill is, at least to some extent, remedied. If necessary, the process is repeated to affect a maximum amount of cleaning.

There are problems that arise when using clay products to clean hydrocarbon spills. Clay products are not bioremedial, i.e. they do not regenerate. This means that once used, the clay product becomes waste. A related problem with the clay products' lack of bioremediation is that, after absorbing a toxic hydrocarbon, the clay product itself becomes a hazardous waste. After absorbing the spill, the user must find a way of disposing of the used clay product in a manner that ensures against pollution of the environment with a hazardous waste material. One method of disposing used clay products has been the use of land fill space. This, of course, is very expensive. Disposing of used clay products in a land fill presents its own set of other problems, including the possibility that the hydrocarbon may leak out of the clay product and into the ground. Leakage of the hydrocarbon into the earth can be very hazardous to the environment.

Because of the need to reduce industrial waste, alternative types of hydrocarbon absorbents are being tried. Some newer absorbents include natural, non-toxic, non-pathogenic, non-caustic, regenerating petrophilic microorganisms. One such suspension is sold under the trademark OIL SPONGE. The regenerating petrophilic microorganisms are live, synergistic groups that digest hydrocarbons and aromatic compounds. Some such microorganisms are believed able to absorb up to eight times more liquid than conventional clay products. The suspension of at least some such absorbents with regenerating petrophilic microorganisms has the consistency of dust.

Petrophilic microorganisms are typically activated to an absorbent state upon contact with a hydrocarbon. As with conventional clay products, the suspension can be poured or otherwise placed directly onto a hydrocarbon spill. After absorbing the hydrocarbon, the suspension can be swept up and, in some instances, immediately disposed. One benefit is that a lesser quantity of cleaning suspension or absorbent is necessary because the petrophilic microorganisms are able to absorb a greater quantity of spill using less absorbent. Accordingly, less used absorbent is generated. There is yet another benefit, however, because the microorganism can regenerate itself for reuse. Under ideal conditions, a petrophilic microorganism may completely regenerate itself in six hours. A petrophilic microorganism is believed able to reach an effective absorbent stage approximately six times. However, even after losing its regeneration capabilities, the petrophilic microorganism will not leak any hydrocarbon and constitutes a non-hazardous waste product. Thus, the petrophilic microorganism suspension can be bagged and routinely disposed, eliminating concern and liability for hazardous waste disposal, including the possibility of costly government citations to the user.

Packaging of conventional clay products is typically accomplished in a single package that permits dispensing of the absorbent onto the spill. Packaging of regenerating microorganism suspension absorbent has, to the inventor's knowledge, tracked conventional clay product packaging, which does not contemplate recycling of the absorbent. Preferably, after the regenerating petrophilic microorganism suspension has been used to absorb a hydrocarbon spill, the used suspension should be stored in a manner such that the microorganism has time to regenerate before it is to be used a second time. Simply storing the suspension in a conventional container is not practical. In that instance, after use, the used suspension would be stored on top of other, unused suspension in the container. If a subsequent spill were needed to be cleaned before the used microorganism suspension were allowed to regenerate, it would be very difficult to obtain unused (or regenerated) suspension from the bottom of the container.

As noted above, industrial environments are typically dirty and messy. In addition to spills, it is not uncommon for a variety of other, extraneous materials to be found on a factory or shop floor, such as screws, bolts, machine parts and other items. Preferably, such items are disposed of in an appropriate manner. If such extraneous items are swept up with a conventional clay absorbent, these extraneous items are readily disposed with the used absorbent.

However, when using a microorganism suspension and seeking to reuse or recycle that suspension, it is important to remove these extraneous items from the suspension before reuse. Another problem is that the used suspension itself can agglomerate, forming clumps. It is necessary to break these clumps up before reusing the suspension.

Thus, a need exists in the art for a device for storing a suspension of petrophilic microorganism.

Due to the regenerating capabilities of the suspension of regenerating microorganism, there is a further need for a device that allows used suspension to regenerate before it is reused, while permitting use of new, unused absorbent.

Yet further, a need exists for a device that filters out solid particles and breaks up or avoids use of clumped suspension particles.

SUMMARY OF THE INVENTION

The present invention solves such problems and fills such needs in the art by providing a device for storing, dispensing and recycling a suspension of regenerating microorganism and a method according to which the suspension can be stored in the device and be allowed to properly regenerate for reuse.

Generally described, the present invention provides a first area for receipt and storage of new suspension, a second area in communication with the first area for receipt and storage of used suspension, and means for accessing said first area without disturbing the used suspension contained in said second area.

Described more particularly, a preferred embodiment of the present invention comprises a device for storing a regenerating microorganism comprising a storage area defining a rear surface. An interior surface extends from the rear surface to define two areas. An opening in the device for accessing the regenerating microorganism suspension from the first area is positioned below the point where the interior surface projects from the rear surface.

In another embodiment of the invention, a bottom surface is provided adjacent to the opening in the device. The interior surface projects toward a front wall and is disposed to meet two side walls. The interior surface terminates prior to reaching the front wall and the bottom surface of the device, thus forming a passage for the regenerating microorganism. A plurality of flanges are provided at or near the top of the device. The flanges support a screen cover. The screen cover acts as a filter to prevent solid particles such as screws and bolts from entering the interior of the device and also breaks up clumps of the suspension prior to entering the interior of the device.

In another embodiment, wheels are attached to the bottom of the device near the corners of the bottom surface. At least one receptacle is attached to the bottom, outside surface of a side wall for receiving a broom, or other cleaning implement. At least one collar, vertically aligned with the receptacle, may be provided for additional support for the broom handle or shovel handle.

The present invention also provides a method of using the device for storing the regenerating microorganism suspension, generally comprising the steps of pouring the suspension of regenerating microorganism into the device, allowing the suspension to pass through a first area defined by an interior surface within the device, removing a portion of the regenerating microorganism suspension from an opening defined in a second area below the interior surface, applying the portion of the regenerating microorganism suspension to absorb the contents of a spill, and sifting the used suspension while returning the used suspension to the device. The screen cover filters the replaced portion of the regenerating microorganism and breaks up any clumps that have formed. The present invention provides time and means for the replaced portion of the regenerating microorganism to regenerate, ensuring that new regenerating microorganism suspension is first removed from the device to be applied to a second or subsequent spill.

Thus, it is an object of the present invention to provide a device to store a regenerating microorganism.

It is a further object of the present invention to provide a device for storing a suspension of regenerating microorganism that also allows used suspension time to regenerate.

It is a further object of the present invention to provide a storage device for a regenerating microorganism suspension that allows a user to replace used suspension in a first area of the device and use suspension from a second area of the device to clean subsequent spills.

It is a further object of the present invention to provide a device that filters solid particles such as screws and bolts from entering the device when replacing used petrophilic microorganism.

It is yet a further object of the present invention to provide a device that breaks up clumps of the suspension of regenerating microorganism before reuse.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

FIG. 1 is a pictorial view of a device for storing a regenerating microorganism embodying the present invention.

FIG. 2 is a top plan view of the device shown in FIG. 1, with the cover removed.

FIG. 3 is a cross-sectional side view of the device for storing a regenerating microorganism with the cover removed.

FIG. 4 is a top plan view of the screen cover of the device shown in FIG. 1.

FIG. 5 is a side view of the device shown in FIG. 1 with broom and shovel.

FIG. 6 is a perspective view of the device shown in FIG. 1 with doors.

DETAILED DESCRIPTION OF THE PREFERRED EMBODIMENT

Referring now in more detail to the drawings in which like numerals refer to like parts throughout the several views, FIG. 1 shows a perspective view of a device 10 for storing, dispensing and recycling a regenerating microorganism embodying the present invention.

The device 10 provides a front wall 12, two side walls 14, 16, a rear wall 18 and a bottom surface 20. The front wall 12 and the two side walls 14, 16 are attached to the edges of the bottom surface 20 and extend upward. The walls 12, 14, 16, 18 are substantially vertical walls. The rear wall 18 is attached along the vertical edges at the top of the two side walls 14, 16 and may be of smaller dimension than that of the other walls 12, 14 and 16 for the reasons set forth herein. The side walls 14, 16 are slightly wider than the front wall 12 and rear wall 18 to form a substantially rectangular shaped device 10. It will be appreciated that other shapes are within the purview, spirit and scope of the present invention.

Figure 6:
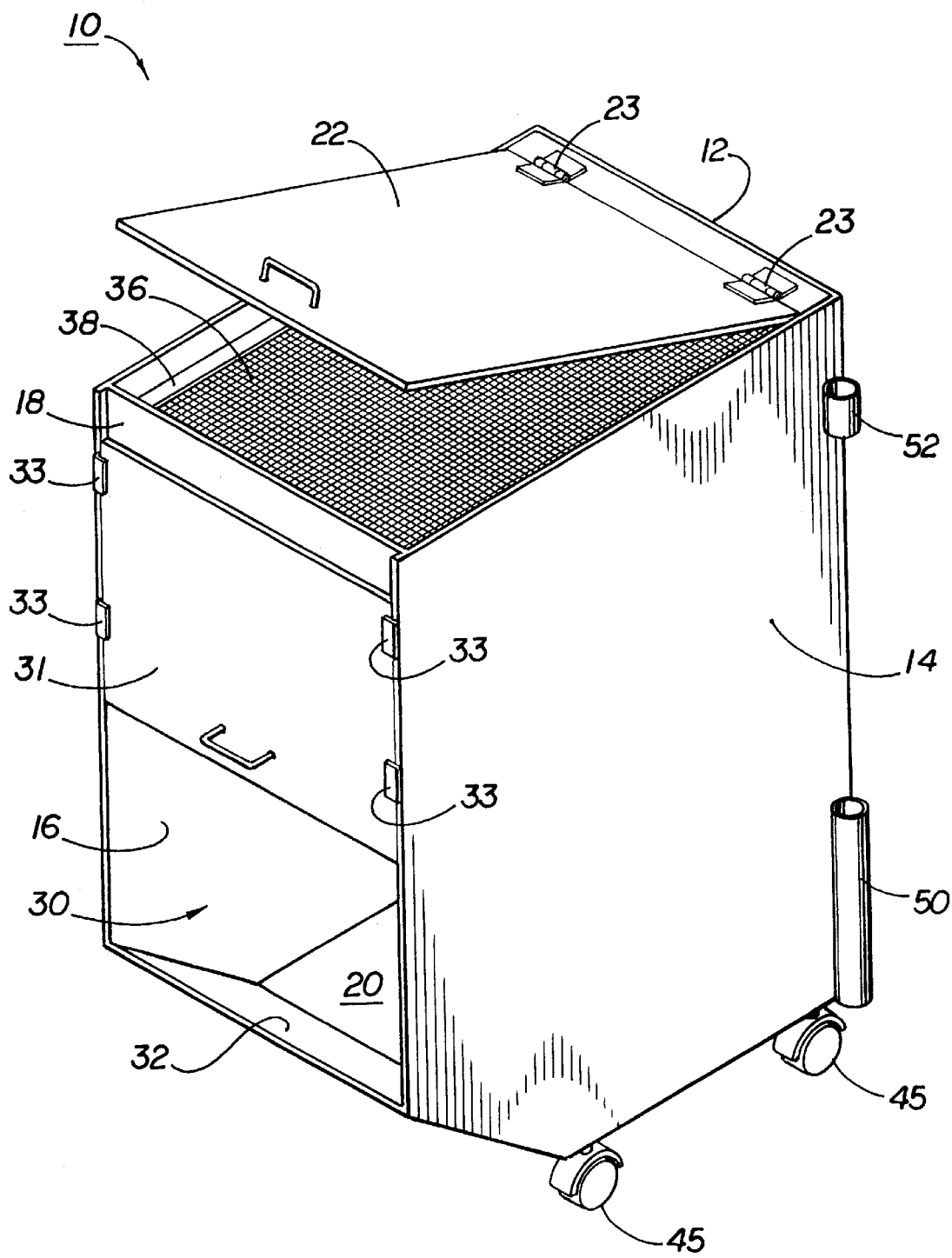

The four substantially vertical walls 12, 14, 16, 18 and the bottom surface 20 create an inlet 21 at the top of the device 10. The regenerating microorganism is placed in the device through the inlet 21. A door 22, as shown in FIG. 6, may be used to cover the device 10 and prevent contaminants and moisture from entering the device, particularly when used in an industrial environment or outdoors. Also, in case a fire develops inside the device, the door 22 can be closed to limit the amount of oxygen entering the device. Hinges 23 located along any one wall of the device 10 connect the door 22 to the device and allow the door to be easily opened and closed.

Figure 3:
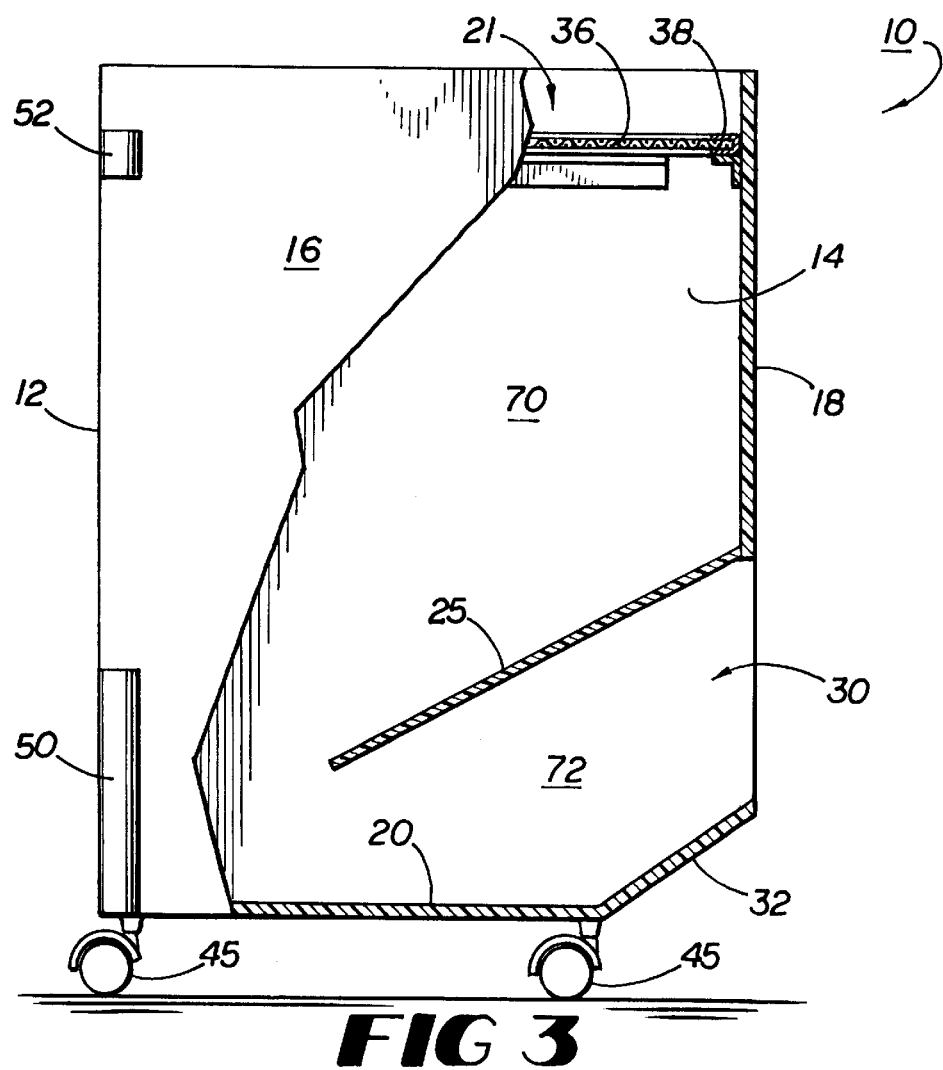

A plate 25 is attached to the interior of the rear wall 18 at the bottom of the rear wall 18, as shown in FIG. 3. The plate 25 is substantially the same width as the rear wall 18 and extends in the interior of the device 10 at an angle towards the bottom surface 20 of the device 10. It should be noted that the plate 25 need not be flat. The plate 25 extending in the interior of the device 10 does not reach the bottom surface 20 or the front wall 12 of the device 10.

An opening 30 is defined in the device 10 as shown in FIG. 1. In one embodiment of the present invention, the opening 30 is defined by the bottom of the rear wall 18, the side walls 14, 16 and the bottom surface 20. The opening 30 is thus positioned below the rear wall 18, and just below the point where the plate 25 is attached to the rear wall 18. In the preferred embodiment of the present invention, the opening 30 is substantially the same width as the rear wall 18 and extends downward to the bottom surface 20. The opening 30 may be of varying dimension, but is large enough to facilitate extraction of the suspension from the device 10. An incline 32 in the bottom surface 20 of the device 10 extends from a portion of the bottom surface 20 adjacent to the rear wall 18 towards the opening 30.

Preferably, a vertically sliding door 31, as shown in FIG. 6, covers the opening 30 when the device 10 is not in use. The sliding door 31 prevents spillage of the suspension when moving the device 10 and also prevents moisture from entering the device. Brackets 33 located along the extended side edges of the rear wall 18 guide the sliding door during opening and closing.

Figure 2:
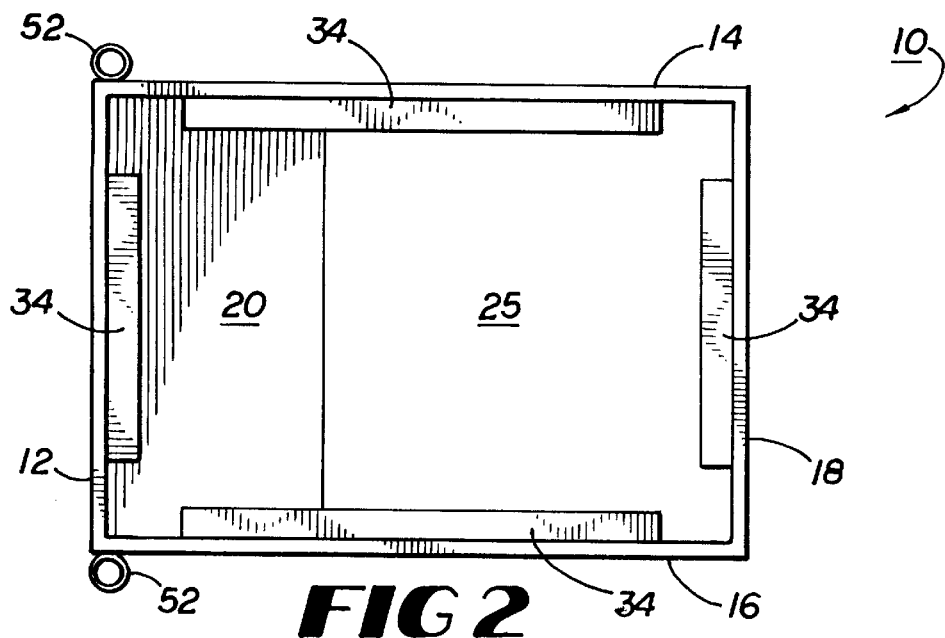

As shown best in FIGS. 2 and 3, near the top of each wall 12, 14, 16, 18 are short flanges 34 extending slightly into the interior of the device 10. The flanges 34 extend perpendicularly from the walls. A screen cover 36, as shown in FIGS. 1 and 4, is used to cover the device 10. A thin frame 38 surrounds the periphery of the screen cover 36. The screen cover is placed on the device 10 so that the frame 38 rests on the flanges 34.

Four wheels 45 are located on the bottom surface 20 of the device 10, one at each corner. Two cylindrical receptacles 50 are attached to the bottom corners of the side walls 14, 16 adjacent to the front wall 12. The receptacles 50 have a solid bottom surface but no top surface and are hollow. Two cylindrical collars 52 are attached to the top corners of the side walls 14, 16 vertically aligned with the receptacles 50. The handle of a broom 54 is placed through one collar 52 and into the corresponding receptacle 50. The handle of a shovel 56 is placed through the other collar 52 and into the other receptacle 50. The broom 54 and shovel 56 are thus suspended from the side walls of the device 10. It should be noted that the receptacle 50 and collars 52 can be of any suitable shape that would support the broom and shovel or any other cleaning implement.

The preferred device 10 may be initially filled through the inlet 21 with approximately ninety pounds (90 lbs.) of regenerating petrophilic microorganism suspension after removing the screen cover 36. This fills the device 10 approximately 75% by volume. A portion of the suspension passes through a first storage area 70 formed by the plate 25 and thus defined by the plate 25 and the upper portion of the walls 12, 14, 16 and 18 as shown in FIG. 3. The device 10 similarly defines a second area 72 below the plate 25. The petrophilic microorganism may be stored in the device 10 indefinitely. The screen cover 36 may be replaced after filling the device 10 covering the inlet 21 so that the frame 38 of the screen rests on the flanges 34. It should be appreciated that the device 10 would be useful for storing any type of regenerating microorganism.

In order to clean a hydrocarbon spill, such as an oil spill, the device 10 can be rolled to the spill using the wheels 45. The shovel 56 or a scoop (not shown) is removed form the receptacle 50 and placed in the opening 30. An appropriate amount of the suspension is removed from the second area 72 of the device 10 using the shovel 56. The suspension is placed on the spilled item and allowed to absorb the contents of the spill.

The absorption process of the regenerating petrophilic microorganism suspension can be enhanced using the broom 54. The broom is removed from the receptacle 50 and used to mix the suspension with the contents of the spill. The suspension may thus more quickly absorb the spilled item.

After the suspension has completely absorbed the spilled item, the broom 54 is used to sweep the used suspension into the shovel 56. The used suspension is then replaced in the first storage area 70 of the device 10 by pouring it onto the screen 36 covering the inlet 21 of the device 10. The replaced suspension filters through the screen cover 36 into the first storage area 70 of the device 10. The screen cover 36 prevents solid particles of any type that may have been mixed with the suspension from entering the device 10 and also breaks up any clumps of suspension that have formed.

Subsequent spills are cleaned according to the above described method using suspension from the bottom or second area 72 of the device 10. As this process is repeated, the replaced suspension works its way through the device 10, from the first area 70 to the second area 72 for reuse. The positioning of the plate 25 in the interior of the device 10 creates a passage through which the replaced suspension passes when moving from the first area 70 to the second area 72. The plate ensures that the suspension used is from the second area 72 of the device 10, allowing the replaced suspension time to regenerate before reaching the opening 30 for reuse.

In one embodiment of the present invention, the device 10 is made of metal. The flat portion of the bottom is 18.5 inches wide and 20 inches long. The incline 32 is 4.5 inches long and 18.5 inches wide and extends upward at an angle of approximately 30° to 40°. The front wall 12 is 32 inches high and 18.5 inches wide and the rear wall 18 is 18 inches high and 18.5 inches wide. The side walls 14, 16 are 24 inches wide and 32 inches long along the front edge that connects with the front wall 12 and 29 inches long along the rear edge that connects with the rear wall 18. The plate 25 is 18.5 inches wide and 18 inches long extending downward at an angle of about 67°. This creates gap of approximately 7 inches between the end of the plate 25 and the bottom surface 20, forming the passage through which the suspension passes, when moving from the first area 70 to the second area 72.

The flanges 34 extend one inch into the interior of the device 10. The flanges located along the side walls 14, 16 are 18 inches long and the flanges located along the front wall 12 and the rear wall 18 are 16 inches long. The screen cover 36 is 23.5×17.5 inches. The frame 38 surrounding the cover is one inch thick.

It is to be appreciated that the spirit and scope of the foregoing invention can be accomplished using a variety of materials so long as such material is compatible with the microorganism suspension. It will be further appreciated that the device may be of any particular size and shape so long as constructed such that incoming new or recently-used suspension is directed away from the inlet and there stored for a sufficient period to permit regeneration of the microorganism.

While the invention has been described in detail with particular reference to preferred embodiment, thereof, it will be understood that variations and modifications can be effected within the spirit and scope of the invention as described hereinbefore and as defined in the appended claims.

I claim:

1. A device for storing a regenerating microorganism comprising:

a first storage area for storing used microorganism;

a second area in communication with said first storage area, said second area storing new and recycled microorganism;

an opening in said device for removing said microorganism stored in said second area; and an incline in the bottom of said second area adjacent to said opening.

2. The device of claim 1 further comprising an inlet for replacing said microorganism after use in said first storage area of said device.

3. A device for storing a regenerating microorganism comprising:

a bottom surface;

three substantially vertical walls extending from the edges of said bottom surface, said walls comprising a front wall and two side walls;

a substantially vertical rear wall opposing said front wall, said rear wall attached to said side walls along the vertical edges of said wall;

a plate attached to said rear wall, said plate extending in the interior of said device at an angle towards said bottom surface;

an opening positioned below the point where said plate is attached to said rear wall; and an incline in said bottom surface extending toward said opening.

4. The device of claim 3, wherein said plate attached to said rear wall is also attached to said side walls.

5. The device of claim 4, wherein said plate extending in the interior of said device terminates prior to reaching said front wall and said bottom surface forming a passage for said regenerating microorganism.

6. The device of claim 5, further comprising a continuous flange attached to said walls extending into the interior of said device, said flange attached to said walls just below the top edges of said walls.

7. The device of claim 5, further comprising a plurality of flanges attached to said walls extending into the interior of said device.

8. The device of claim 7, wherein said flanges are attached to said walls just below the top edges of said walls.

9. The device of claim 7, further comprising a screen cover which rests on said flanges.

10. The device of claim 9, wherein said screen cover comprises a frame around the periphery of said cover, said frame resting on said flanges when said device is covered.

11. The device of claim 10, further comprising four wheels attached to the bottom of said device, said wheels located near the corners of said bottom surface.

12. The device of claim 11, further comprising at least one receptacle attached to the bottom outside of said side walls, said receptacle configured to receive a cleaning implement.

13. The device of claim 12, further comprising at least one collar attached to the top outside of said side wall vertically aligned with said receptacles, said collar comprising further support for said cleaning implement.

14. A method of storing a regenerating microorganism, comprising, the steps of:

pouring a regenerating microorganism into a device, said regenerating microorganism passing through a passage formed by a plate inside said device extending from a wall of said device, said plate forming a first storage area in said device above said plate and a second area in said device below said plates;

removing a portion of said regenerating microorganism from said second area through an opening in said device, said opening positioned below the point where said plate is attached to said wall;

placing said portion of said microorganism on a spill; and allowing said portion of said microorganism to absorb the contents of said sill.

15. The method of claim 14, further comprising the steps of placing a screen cover on said device.

16. The method of claim 14, further comprising replacing said portion of said microorganism into said first storage area of said device by pouring said portion of said microorganism onto said screen cover;

allowing said replaced portion of said microorganism to filter through said screen cover into said first area of said device;

removing said microorganism from said second area of said device through said opening in said device to clean subsequent spills; and allowing said replaced portion of said microorganism to regenerate as it travels from said first storage area through said passage into said second area toward said opening for reuse.

17. The method of claim 16, wherein said screen cover breaks up clumps formed in said replaced portion of said microorganism.

18. The method of claim 17, wherein said screen cover filters out solid particles mixed with said replaced portion of said microorganism.

* * * * *